United States Patent [19]

Brosens

[11] 4,135,119
[45] Jan. 16, 1979

[54] LIMITED ROTATION MOTOR

[75] Inventor: Pierre J. Brosens, Belmont, Mass.

[73] Assignee: General Scanning, Inc., Watertown, Mass.

[21] Appl. No.: 780,475

[22] Filed: Mar. 23, 1977

[51] Int. Cl.² .............................................. H02K 33/10
[52] U.S. Cl. ...................................... 318/128; 310/25; 310/36; 335/230; 350/6.1
[58] Field of Search .................... 335/229, 230, 272; 310/36–39, 29, 72, 68 D, 75; 318/127–132; 350/6

[56] References Cited

U.S. PATENT DOCUMENTS

| Re. 26,749 | 1/1970 | Montagu | 335/229 |
|---|---|---|---|
| 2,829,324 | 4/1958 | Sargeant | 318/128 |
| 2,930,945 | 3/1960 | Weathers et al. | 335/230 |
| 3,329,916 | 7/1967 | Carson | 335/230 |
| 3,434,083 | 3/1969 | Lewis | 335/230 |
| 3,435,393 | 3/1969 | Meisel | 335/230 X |
| 3,517,360 | 6/1970 | Gray | 335/230 |
| 3,668,672 | 6/1972 | Parnell | 340/200 |
| 3,970,979 | 7/1976 | Montagu | 310/36 X |

Primary Examiner—Donovan F. Duggan

[57] ABSTRACT

A limited rotation motor has a stator and a rotor mounted for limited rotation relative to the stator. The stator is constructed to conduct bias flux through magnetic circuits that extend across air gaps between the stator and the rotor and a drive system produces drive flux which is conducted through magnetic circuits that extend across air gaps between the stator and rotor to drive the rotor. The stability of radial rotor position in its support bearings is enhanced by an imbalance in the bias flux magnetic circuits which continually produces a resultant radial force on the rotor so that a well defined radial position of the rotor is maintained over the range of limited rotation that the rotor moves in response to the drive system.

22 Claims, 12 Drawing Figures

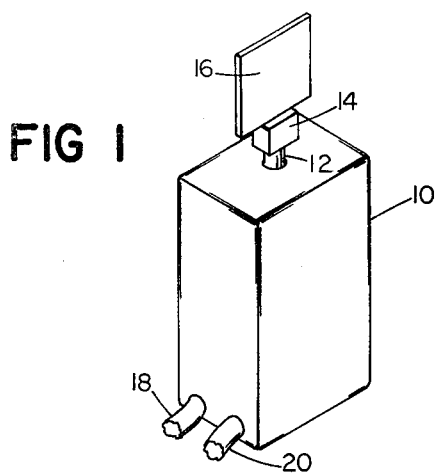
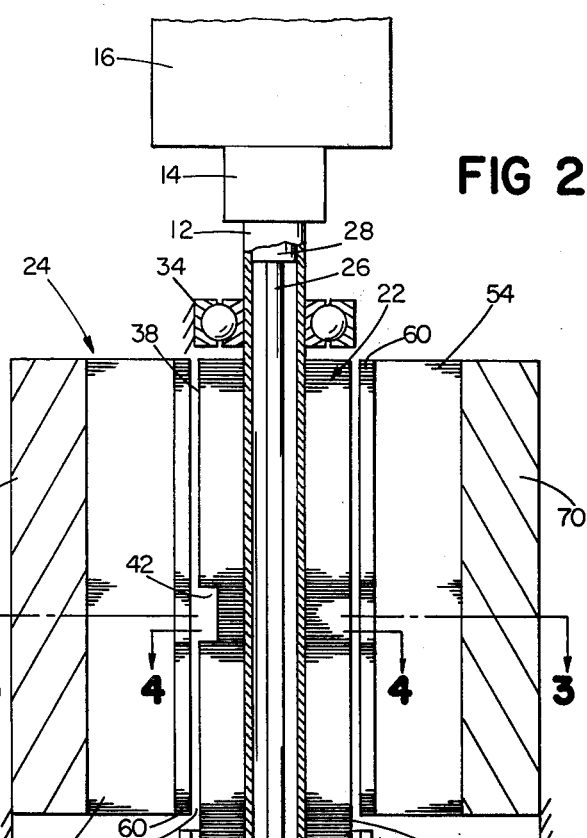
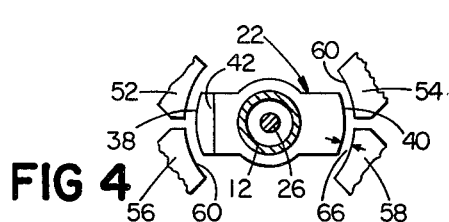
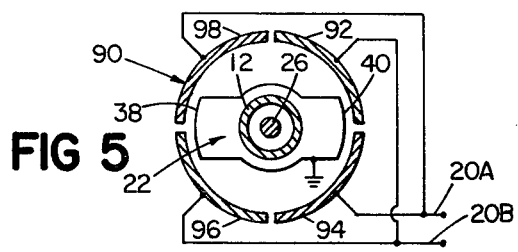
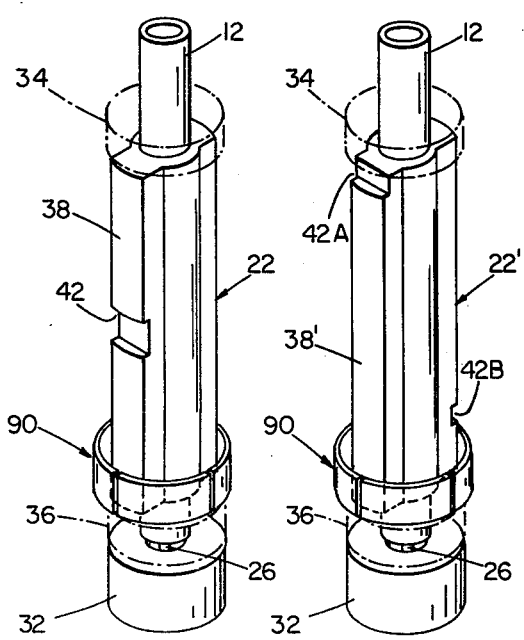
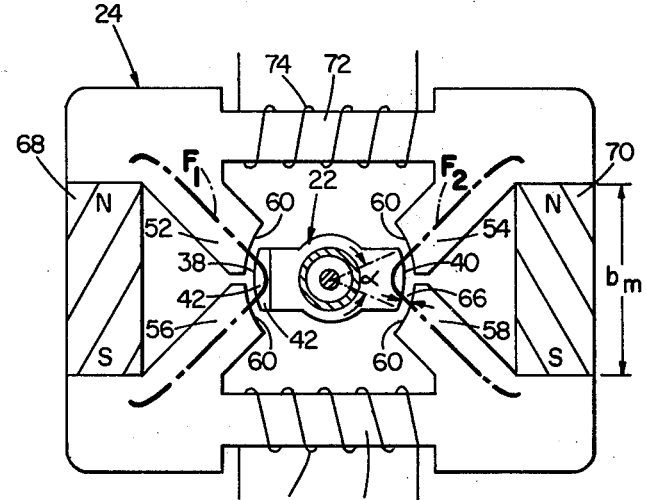

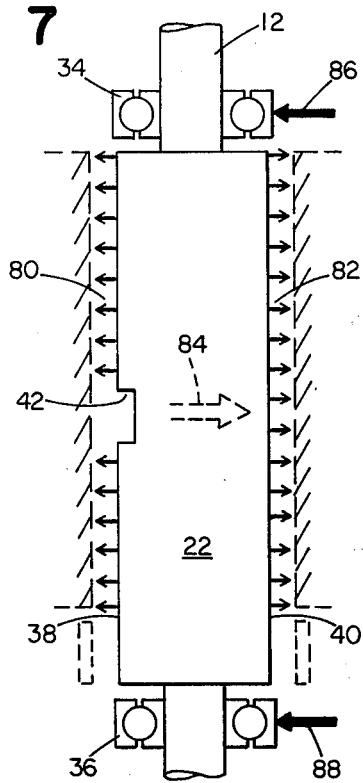
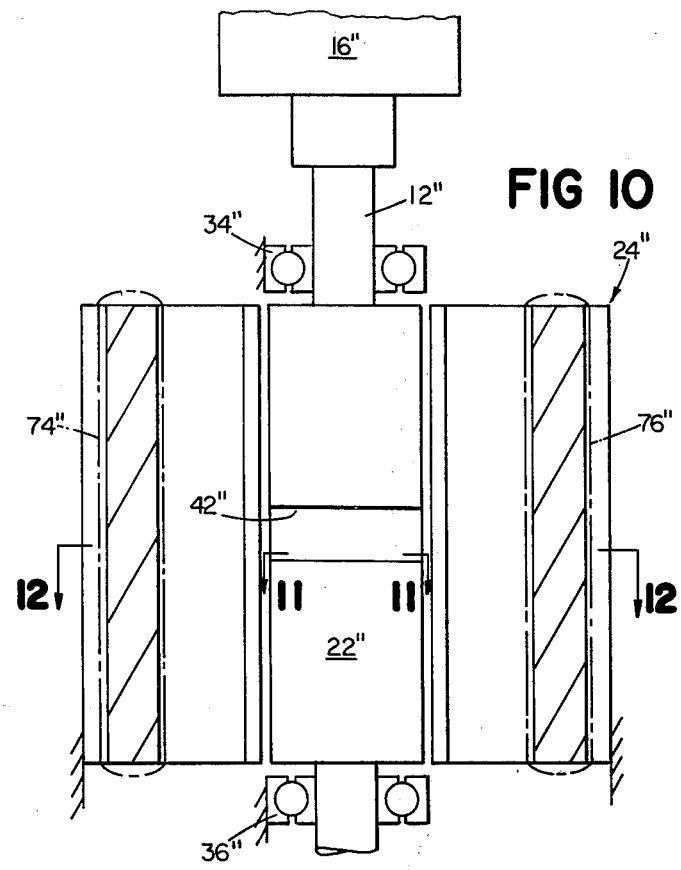
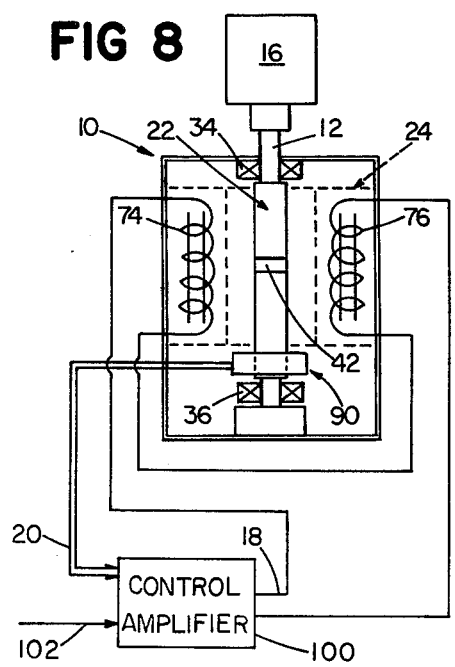
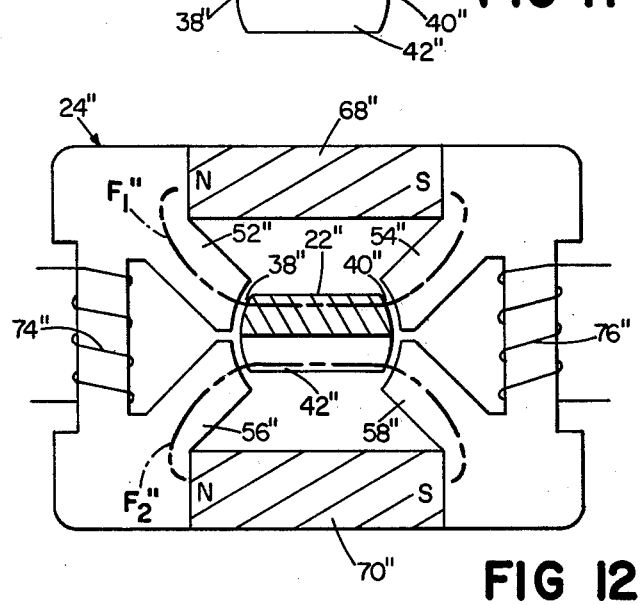

LIMITED ROTATION MOTOR

This invention relates to electromechanical transducers, and more particularly to limited rotation motors of the type particularly useful in deflecting, scanning, interrupting or chopping beams of light, ions, electrons or other similar streams of low mass.

A typical application of an optical scanner is to rotate a mirror about an axis to deflect a beam of light, and both high speeds of response to drive signals and precise angular positioning of the mirror are of increasing importance. Limited rotation motors are particularly useful mirror drives, the mirror being driven by a motor rotor which is located in an initial reference position by a restoring force arrangement and rotated in response to interaction between bias flux produced by a permanent magnet circuit and drive flux produced in response to drive signals, the restoring force arrangement tending to return the mirror to its initial reference position. A source of error in such scanners is certain unwanted radial motion of the rotor attributable to uncertain positioning of the rotor in its bearings. U.S. Pat. No. 3,624,574 describes a deliberately offset torsion bar which imposes a side radial load at the rotor bearings and thereby obtains an improved rolling configuration of the rotor. While such an offset torsion bar arrangement is satisfactory for many applications, it is difficult to obtain adequate radial loading at the bearings in arrangements that employ a long torsion bar. Further, the offset torsion bar may occasionally contact rotor structure such as a tubular rotor shaft producing random rotor torque perturbations. Another and frequently more significant problem arises in an optical scanner that utilizes a position transducer to generate an electrical signal indicative of rotor position. A minute lateral displacement of the rotor produces a change in the electrical signal generated by the transducer and the feedback circuit responds to that changed electrical signal by repositioning the rotor to an erroneous angular position. Such erroneous repositioning of the rotor cannot be tolerated in those optical scanner arrangements or other limited rotation motor applications that require a high degree of precision.

In accordance with the invention there is provided a limited rotation motor with a stator and a rotor mounted for limited rotation relative to the stator. The stator conducts bias flux through magnetic circuits that extend across air gaps between stator pole faces and juxtaposed rotor pole faces and the rotor is driven by a drive coil arrangement that produces drive flux. An imbalance in the magnetic circuits is such that the bias flux continually produces a resultant radial force of relative small value compared to the total radial force provided by the total bias flux, the resultant radial force being effective to urge the rotor radially in its bearing assemblies to maintain a well defined radial position of said rotor over the range of limited rotation of the rotor in response to current flow the drive coils. This magnetic circuit imbalance may be provided in a variety of ways, for example with permanent magnets of different strengths in different magnetic circuits, or with magnetic circuits with different reluctances. The magnetic circuit imbalance is obtained in preferred embodiments with effectively opposed magnetic circuits that have air gaps of different dimensions or in different locations. Such limited rotation motors may also include a position transducer arranged to provide an electrical signal indicative of the position of the rotor relative to the stator, and in preferred embodiments the position transducer includes a set of capacitor plates spaced about the periphery of the rotor.

In particular embodiments, the limited rotation motor includes a stator assembly that includes two permanent magnets that extend the axial length of the stator assembly on opposite sides of the rotor. A magnetic circuit is associated with each permanent magnet and extends through one stator pole across an air gap to the rotor and then back across an air gap to a second stator pole for return to the permanent magnet. A portion of the air gap area in one magnetic circuit is of enlarged dimension and produces the magnetic circuit imbalance. While this enlarged air gap area may be distributed along the length of the juxtaposed stator and rotor pole faces, and may be provided in either the rotor structure or stator structure, in particular embodiments the enlarged air gap is in the form of a notch or notches in the rotor, the pole face area of the notch or notches being about five percent of the total pole face area of the rotor in the air gap regions between the rotor and stator poles.

Preferably the magnetic circuit imbalance produces a radial force at each support bearing in the range of 50–300 grams. This motor arrangement provides excellent rotor stability over the rotor's excursion range of angular movement without excessive loading of the bearings and produces in a simple and economical manner a radial force that is nearly independent of rotor position and coil current.

In particular embodiments, the limited rotation motor includes: a stator assembly that has two sets of stacked ferromagnetic stator laminations, each set defining two stator poles and carrying a drive coil; and a rotor body that is similarly composed of a stack of ferromagnetic laminations. The axial length of the rotor body is greater than the axial length of the stator assembly and the rotor defines two opposed rotor poles, each of which is disposed adjacent but spaced from two stator poles. A rotor shaft extends axially from each end of the rotor and carries a ball bearing assembly for radially supporting the rotor relative to the stator so that an axially extending air gap is defined between each rotor pole and adjacent stator poles. The two sets of stator laminations are disposed on opposite sides of the rotor with the stator poles extending generally radially inwardly towards the rotor. The two sets of stator laminations are interconnected by two axially extending permanent magnets, each of which completes a magnetic circuit associated with a corresponding rotor pole. The reluctance of one magnetic circuit is modified by a notch in one rotor pole. Coaxially disposed within the tubular rotor shaft is a torsion bar that has its upper end secured to the upper end of the rotor shaft and its lower end secured to a mount fixed to the stator assembly. The upper end of the rotor shaft, which extends beyond the upper bearing assembly, is adapted to receive an output device such as a mirror mount. A capacitive position transducer assembly at the lower end of the stator assembly surrounds the lower end of the rotor and includes four arcuate conductive plates, each of which is slightly less than 90° in angular extent. The magnetic circuit imbalance created by the notch in the rotor pole face produces a radial force which reduces erratic motion of the rotor body due to play in the ball bearing assemblies and thus enhances the precision of both the angular positioning of the output device mounted on the rotor shaft and the signal produced by the capacitive position transducer. This motor arrangement provides a compact optical scanner of ultra high speed response and improved precision in which a stabilizing radial force is provided in a simple and economical manner.

Other features and advantages will be seen as the following description of particular embodiments progresses, in conjunction with the drawings, in which:

FIG. 1 is a perspective view of an optical scanner in accordance with the invention;

FIG. 2 is a vertical cross-section in diagrammatic form of the scanner shown in FIG. 1;

FIG. 3 is a diagrammatic horizontal cross-sectional view taken along the line 3—3 of FIG. 2;

FIGS. 4 and 5 are horizontal cross-sections taken along the lines 4—4 and 5—5 of FIG. 2, respectively;

FIG. 6 is a perspective view of the rotor employed in the scanner of FIGS. 1-3;

FIG. 7 is a free body force diagram of the rotor in the motor shown in FIGS. 1-3;

FIG. 8 is a diagram of the optical scanner of FIG. 1 with a connected control amplifier;

FIG. 9 is a perspective view of the rotor of another motor embodiment;

FIG. 10 is a vertical cross section in diagrammatic form of still another embodiment in accordance with the invention;

FIG. 11 is a sectional view taken along the line 11—11 of FIG. 10; and

FIG. 12 is a diagrammatic horizontal cross-sectional view of the embodiment shown in FIG. 10 taken along the line 11—11 of FIG. 10.

DESCRIPTION OF PARTICULAR EMBODIMENTS

The optical scanner shown in FIG. 1 includes a casing 10 having a shaft 12 extending from its upper end on which a bracket 14 is secured and which supports a mirror 16. Extending from its lower end of casing 10 is a drive coil cable 18 and a transducer lead cable 20. In this embodiment casing 10 has a height of 3.1 inch, a width of 1.75 inch, and a depth of 1.25 inch, and shaft 12 has a diameter of 0.1875 inch. The optical scanner is a moving iron galvanometer with a position transducer, and is designed specifically for closed loop operations with a range of mirror rotation excursion of up to 25° and provides servo-controlled deflection of mirrors with dimensions up to 10×10 centimeters. A scanner with a mirror of 25×25 millimeter size has flyback time of less than five milliseconds, transducer linearity better than ±0.15% of the working excursion, and shaft wobble that is typically below five arc seconds.

Further details may be seen with reference to FIGS. 2-6. The scanner has a rotor 22 and a stator 24, each composed of stacked ferromagnetic laminations. The rotor laminations are supported on and fixed to tubular shaft 12. A high compliance torsion bar 26 disposed within hollow shaft 12 has its upper end 28 secured to shaft 12 and its lower end 30 secured in mount 32 that is fixed to stator 24. Shaft 12 is supported for rotation on instrument ball bearing assemblies 34, 36, e.g. with an instrument ball bearing of 0.5 inch diameter, radial play is typically 0.0002 inch. The rotor has arcuate faces 38, 40. In this embodiment the body of rotor 22 has a length of 1.75 inch and a diameter between faces 38, 40 of 0.49 inch. Slot 42 in pole face 38 of rotor 22 has a depth of about 0.05 inch, an axial length of 0.188 inch and is positioned 0.75 inch from the top of the lamination stack.

The stator assembly 24 has a length of 1.5 inch and as shown in FIG. 3, includes two stacks of ferromagnetic laminations, one stack providing poles 52, 54, and a second stack providing poles 56, 58. Each pole has an end surface 60 that defines a cylindrical stator pole face that is spaced from a cylindrical rotor pole face 38, 40 by air gap 66 of 0.0045 inch. Permanent magnet 68 provide bias flux $\phi_1$ in a magnetic circuit $F_1$ that extends through stator poles 52 and 56, air gap 66 and rotor 22; and permanent magnet 70 provides bias flux $\phi_2$ in a second magnetic circuit $F_2$ that extends through stator poles 54 and 58, air gap 66 and rotor 22. Rotor slot 42 is in the first magnetic circuit $F_1$. The stator assembly includes portions 72 about which are wound drive coils 74, 76 that are connected to cable 18. Drive flux, generated by current flowing in coils 74, 76, interacts with the bias flux $\phi_1$ and $\phi_2$ to produce drive torque that causes angular movement of rotor 22 about its axis, the direction of angular movement being a function of the direction of the drive flux and this angular movement being opposed by restoring force provided by torsion bar 26.

FIG. 7 is a free body diagram of the rotor 22 showing the radial loading on bearings 34, 36. The magnetic flux produced by the bias magnetic circuit $F_1$ associated with magnet 68 produces forces indicated by arrows 80 that extend across the air gap between rotor pole face 38 and the adjacent stator pole face 60, while arrows 82 indicate the forces produced by the bias flux in the magnetic circuit $F_2$ associated with magnet 70 across the air gap between rotor pole face 40 and the adjacent stator pole faces. Due to notch 42, these opposed bias flux forces are imbalanced producing a resulting radial force indicated by arrow 84 on rotor 22 which is transmitted by shaft 12 to the ball bearing assemblies 34, 36. This resultant force is opposed at each bearing by forces indicated at arrows 86, 88, so that a permanent radial force is applied to the bearing assemblies 34, 36 which provides increased certainty of positioning of the rotor 22 in bearings 34, 36.

The lower end of rotor 22 extends beyond stator 24 and cooperates with a capactive position sensor assembly 90 that includes four stationary quadrant plate electrodes 92, 94, 96, 98 that are connected to transducer leads 20 as indicated in FIGS. 5 and 8. Rotor 22 is grounded electrically via torsion bar 26 and the difference in capacitances to ground between leads 20A and 20B is measured as a transducer output signal. A drive signal is applied to control amplifier 100 over input 102 and its output is applied to drive coils 74, 76. The current flow in the drive coils 74, 76 produces drive flux which interacts with the bias flux provided by the permanent magnet circuits and produces an angular torque on the rotor body which is resisted by a restoring force provided by the torsion bar. Rotor 22 and mirror 66 are thus driven in rotation about the axis defined by bearings 34, 36. A feedback signal from position transducer 90 is applied over lines 20 to control amplifier 100 in a closed loop circuit to provide monitoring and automatic correction of rotor position.

With reference to FIG. 3, permanent magnet 68 provides bias flux $\phi_1$ in the magnetic circuit $F_1$ that extends through stator pole 52, air gap 66, the adjacent rotor pole, back through air gap 66 and stator pole 56 to magnet 68; while magnet 70 provides bias flux $\phi_2$ through a magnetic circuit $F_2$ that extends through stator pole 54 and across air gap 66 to the opposite rotor pole and then back through stator pole 58 to the magnet. The reluctance ($R_1$) of the first magnetic circuit (assuming that the local value where the rotor slot 42 is located is infinite) is approximated by:

$$R_1 = \frac{2g}{\mu(1-s)\frac{r\alpha}{2}} \quad (1)$$

where
g = width of air gap,
l = stator length,
s = axial length of slot,
r = rotor radius, and
α = angular extent of rotor pole face.

The reluctance ($R_2$) of the second magnetic circuit $F_2$:

$$R_2 = \frac{2g}{\mu\, l\, \frac{r\alpha}{2}} \quad (2)$$

The flux flowing in each magnetic circuit:

$$\phi_1 = \frac{F_M}{R_1} \quad \phi_2 = \frac{F_M}{R_2} \quad (3)$$

where $F_M$ is the magnetomotive force of magnets 68, 70:

$$F_M = \frac{b_m H_M}{1.35} \quad (4)$$

where
$b_m$ = magnet length (FIG. 3),
$H_M$ = magnetizing force,
1.35 is a design factor for loss of magnetizing force.

The radial force at each gap in the first magnetic circuit is:

$$f_1 = \frac{\phi_1^2}{2(1-s)\mu\frac{r\alpha}{2}} = \frac{(F_M/R_1)^2}{2(1-s)\mu\frac{r\alpha}{2}} = \frac{\mu(1-s)\frac{r\alpha}{2}F_M^2}{2(2g)^2} \quad (5)$$

and the radial force at each gap in the second circuit is:

$$f_2 = \frac{\phi_2^2}{2\, l\, \mu\frac{r\alpha}{2}} = \frac{\mu\, l\, \frac{r\alpha}{2}F_M^2}{2(2g)^2} \quad (6)$$

The imbalance for the two pairs of opposed radial forces is:

$$\Delta f = 2(f_2 - f_1) = \frac{\mu s \frac{r\alpha}{2}F_M^2}{(2g)^2} = \frac{\mu s r\alpha}{3.65}H_M^2\left(\frac{b_m}{2g}\right)^2 \quad (7)$$

In this particular embodiment:
s = 0.188 inch = 4.78 × 10$^{-3}$ meter
r = 0.25 inch = 6.35 × 10$^{-3}$ meter
α = 43° = 0.75 radian
$b_m$ = 0.625 inch
g = 0.0045 inch
$H_M$ = 12,000 ampere turns per meter
μ = 4π × 10$^{-7}$ henry per meter
$f_2$ = 21.7 newtons Δf = 5.44 newtons or 267 grams radial force at each bearing.

Another motor embodiment employs a modified rotor 22' which, as shown in FIG. 9 has axially offset modified air gap regions in the two opposed pole faces 38', 40'. That is, rotor 22' has a notch 42A in the upper end of pole face 38' and a notch 42B adjacent the lower end of the opposite pole face 40'. Each notch 42A, 42B in this embodiment has an axial length of 0.094 inch, a depth of 0.05 inch, and extends across the entire width of its pole face. When used with stator 24, the resultant radial forces produced by the opposed bias flux circuits are opposed by forces that act in opposite directions at bearings 34, 36, thus increasing the certainty of rotor position in bearings 34, 36.

Still another embodiment is shown in FIGS. 10–12. In this embodiment permanent magnets 68" and 70" are oriented so that a first bias flux circuit $F_1$" extends from magnet 68" through stator pole 52" across the air gap to rotor pole face 38", through the rotor to rotor pole face 40", then through stator pole 54" to return to magnet 68". Similarly a second bias flux circuit $F_2$" extends from magnet 70" through stator pole 56", rotor pole face 38", rotor pole face 40" and stator pole 58" to return to magnet 70". Rotor 22" has modified air gap regions in the two opposed pole faces 38", 40", each modified air gap region being provided by a notch 42" at one side of each pole face and located at the center of the axially extending air gap between the stator and that rotor pole such that the reluctance of the bias flux magnetic circuit $F_2$" (FIG. 12) is greater than the reluctance of bias flux magnetic circuit $F_1$". The resulting magnetic circuit imbalance produces radial preloading of bearings 34", 36" by similar amounts and in the same directions and provides improved stabilization of rotor 22".

While particular embodiments of the invention have been shown and described, other embodiments will be apparent to those skilled in the art and therefore it is not intended that the invention be limited to the disclosed embodiments or to details thereof and departures may be made therefrom within the spirit and scope of the invention.

What is claimed is:

1. A limited rotation motor useful in an optical scanner or the like comprising a stator that defines a plurality of axially extensive stator poles, an axially extensive rotor mounted for limited rotation relative to said stator and having axially extensive rotor poles for interaction with said stator poles, an axially extending rotor shaft at each end of said rotor, a bearing on each said rotor shaft for radially supporting said rotor relative to said stator so that an axially extensive air gap is defined between each rotor pole and adjacent stator poles, one of said shafts adapted to carry a device such as a mirror for rotation therewith, a restoring force arrangement for locating said rotor in an initial reference position and tending to restore said rotor to said initial reference position when said rotor has been rotated from said reference position, drive coil means on said stator for producing drive flux, said stator being constructed to conduct said drive flux through magnetic circuits that extend across air gaps between faces of said stator poles and said rotor poles to interact with bias flux to change the angular position of said rotor, said stator including effectively opposed bias flux magnetic circuits that extend across air gaps between faces of said stator poles and said rotor poles which produce radial forces acting upon said rotor effectively in opposite radial directions, a face of a pole in one of said bias flux magnetic circuits having a transversely extending discontinuity of limited axial extent at a selected position along the axial length of said pole face whereby the radial forces produced by said bias flux magnetic circuits are unbalanced to continually produce a resultant radial force of relatively small value compared to the total radial force provided by a given said bias flux, said resultant radial force effective to urge said rotor and its shafts radially in its said bearings to maintain a well defined radial position of said rotor over the range of limited rotation of said rotor while major portions of the applied radial forces produced by said bias flux magnetic circuits are effectively opposed and do not have load effect on said bearings.

2. The motor as claimed in claim 1 wherein said discontinuity is notch in the face of at least one of said stator and rotor poles.

3. The motor as claimed in claim 2 wherein said notch is located adjacent the axial center of an air gap between said stator and rotor poles.

4. The motor as claimed in claim 2 wherein said radial force imbalance is due to notches at axially opposite ends of air gaps between said stator and rotor poles.

5. The motor as claimed in claim 2 wherein said rotor has two opposed pole faces and a notch is in each rotor pole face.

6. The motor as claimed in claim 2 wherein the total axial length of said notch or notches is in the order of ten percent of the axial length of said rotor.

7. The motor as claimed in claim 1 and further including a position transducer secured to said stator and arranged to provide an electrical output signal indicative of the position of said rotor relative to said stator.

8. The motor as claimed in claim 7 wherein said position transducer includes a set of capacitor plates spaced about the periphery of said rotor.

9. The motor as claimed in claim 7 and further including an amplifier responsive to a drive signal and said transducer output signal for energizing said drive coil means to produce said drive flux.

10. The motor as claimed in claim 1 wherein the radial force applied to each bearing due to said radial force imbalance is in the range of 50-300 grams.

11. A limited rotation motor comprising a stator assembly that defines a plurality of axially extensive stator poles and carries a drive coil, an axially extensive rotor defining a plurality of axially extensive rotor poles, an axially extending shaft at each end of said rotor, a bearing assembly on each said shaft for radially supporting said rotor relative to said stator assembly so that an axially extensive air gap is defined between each rotor pole and adjacent stator poles, said stator assembly including bias flux magnetic circuits that extend across air gaps between faces of said stator poles and said rotor poles which produce radial forces acting upon said rotor effectively in opposite radial directions, each said bias flux magnetic circuit including a permanent magnet, a face of a pole in one of said bias flux magnetic circuits having a transversely extending discontinuity of limited axial extent at a selected position along the axial length of said pole face whereby the radial forces produced by said bias flux magnetic circuits are unbalanced and continually produce a resultant radial force of relatively small value compared to the total radial force provided by a given said bias flux, said resultant radial force being effective to urge said rotor and its shafts radially in its said bearing assemblies to maintain a well defined radial position of said rotor over the range of limited rotation of said rotor while major portions of the applied radial forces produced by said bias flux magnetic circuits are effectively opposed and do not have load effect on said bearing assemblies, said stator assembly being constructed to conduct drive flux produced by said drive coil through magnetic circuits that extend across air gaps between said stator poles and said rotor poles to interact with bias flux to change the angular position of said rotor, and a bias arrangement between said rotor and said stator assembly for producing a force tending to restore said rotor to a rest position.

12. The motor as claimed in claim 11 wherein the air gap region has radial asymmetry.

13. The motor as claimed in claim 11 wherein the air gap region has axial asymmetry.

14. The motor as claimed in claim 11 wherein said rotor is of greater axial length than the axial length of the stator assembly and further including a position transducer assembly for producing an output signal indicative of the angular position of said rotor.

15. The motor as claimed in claim 14 wherein the radial force applied to each bearing assembly due to said magnetic circuit imbalance is in the range of 50-300 grams.

16. The motor as claimed in claim 15 wherein said discontinuity is a notch in the face of at least one of said stator and rotor poles.

17. The motor as claimed in claim 16 wherein the total pole face area occupied by said notch or notches is in the order of five percent of the total area of said rotor pole faces in the air gap region between said stator and rotor poles.

18. The motor as claimed in claim 17 wherein a notch is located adjacent the axial center of an air gap between said stator and rotor poles.

19. The motor as claimed in claim 17 wherein said pole notches are located at axially opposite ends of air gaps between said stator and rotor poles.

20. The motor as claimed in claim 17 wherein said rotor has two opposed pole faces and a notch is in each rotor pole face.

21. The motor as claimed in claim 17 wherein said rotor is of greater axial length than the axial length of the stator assembly and said position transducer assembly includes a ring of arcuate capacitor plates spaced about the periphery of said rotor at one end of said stator assembly, each said capacitor plate being about 90° in angular extent and said ring being disposed concentrically with said rotor.

22. The motor as claimed in claim 21 wherein said stator assembly has two sets of ferromagnetic stator laminations, each of which defines two stator poles and includes a section that carries a drive coil, said rotor includes a stack of ferromagnetic laminations of greater axial length than the axial length of the stator assembly, amd said rotor defines two opposed rotor poles,
a tubular shaft extends through said rotor and axially beyond either end of said rotor, each said bearing assembly is of the ball bearing type,
and said bias arrangement includes a torsion bar coaxially disposed within said tubular rotor shaft and has one end secured to said rotor shaft and its other end secured to said stator assembly for producing a force tending to restore said rotor to said rest position.

* * * * *